(12) United States Patent
Nill et al.

(10) Patent No.: US 8,282,332 B2
(45) Date of Patent: Oct. 9, 2012

(54) CONVEYING AND LOCK SYSTEM

(75) Inventors: Eberhard Nill, Stuttgart (DE); Anton Schmillen, Gaertringen (DE)

(73) Assignee: Nill-Tech GmbH, Holzgerlingen (DE)

( * ) Notice: Subject to any disclaimer, the term of this patent is extended or adjusted under 35 U.S.C. 154(b) by 1094 days.

(21) Appl. No.: 12/086,331

(22) PCT Filed: Nov. 23, 2006

(86) PCT No.: PCT/DE2006/002062
§ 371 (c)(1),
(2), (4) Date: Jun. 11, 2008

(87) PCT Pub. No.: WO2007/076744
PCT Pub. Date: Jul. 12, 2007

(65) Prior Publication Data
US 2009/0162149 A1     Jun. 25, 2009

(30) Foreign Application Priority Data

Dec. 15, 2005 (DE) .......................... 10 2005 059 856

(51) Int. Cl.
*B65G 25/00* (2006.01)

(52) U.S. Cl. ........................................ 414/158; 414/190

(58) Field of Classification Search .................. 414/158, 414/190
See application file for complete search history.

(56) References Cited

U.S. PATENT DOCUMENTS

| | | | | |
|---|---|---|---|---|
| 3,896,923 A | * | 7/1975 | Griffith | ........................ 198/661 |
| 4,197,092 A | * | 4/1980 | Bretz | ........................... 48/86 R |
| 5,558,203 A | | 9/1996 | Herm | |
| 5,720,232 A | | 2/1998 | Meador | |
| 5,846,498 A | * | 12/1998 | Kingsley | ........................ 422/227 |
| 6,627,174 B1 | | 9/2003 | Judat | |

FOREIGN PATENT DOCUMENTS

| | | |
|---|---|---|
| CN | 1 284 537 | 2/2001 |
| DE | 211 946 | 7/1909 |
| DE | 660 929 | 5/1938 |
| DE | 32 14 623 | 3/1984 |
| DE | 35 23 655 | 2/1987 |
| DE | 35 45 339 | 7/1987 |
| DE | 199 10 212 | 11/2000 |
| GB | 699 962 | 11/1953 |
| WO | WO 2005/071043 | 8/2005 |

* cited by examiner

*Primary Examiner* — Saul Rodriguez
*Assistant Examiner* — Willie Berry, Jr.
(74) *Attorney, Agent, or Firm* — Paul Vincent

(57) ABSTRACT

A conveying and lock system (10) for introducing a bulk material into a reactor (14) with exclusion of gas and while preventing gas exchange at low pressure differences has a screw shaft (44) on which first windings (46) and second windings (48) are formed. A winding-free section (50) is disposed between the first and the second windings (46, 48) in which the conveyed bulk material is compacted. The compacting causes a bulk material plug which is substantially gas free and, during bulk material transport, the bulk material plug is constantly formed in the conveying and lock system (10) by the screw shaft (44) to prevent gas exchange between the product inlet and the product outlet of the conveying and lock system.

25 Claims, 2 Drawing Sheets

CONVEYING AND LOCK SYSTEM

This application is the national stage of PCT/DE2006/002062 filed on Nov. 23, 2006 and also claims Paris Convention priority to DE 10 2005 059 856.0 filed on Dec. 15, 2005.

BACKGROUND OF THE INVENTION

The invention concerns a conveying and lock system for introducing bulk material to a reactor, with the exclusion of gas, and while preventing gas exchange at low pressure differences, the system having a housing and a screw shaft disposed therein which is driven to transport the bulk material from an entrance opening to an outlet opening in the housing.

In a plurality of preparation processes involving bulk materials, it is either desirable or technically necessary that the process takes place without or substantially without air in order to be able to achieve the desired purpose or such that the amount of air transported along with the bulk material is reduced to a minimum before the bulk material is subject to further processing. An example thereof are processes with which high energy content fuels are generated from plastic waste. Towards this end, it is important that the plastic pieces or plastic waste which is to be processed be safely and reliably transported to a reactor, often with large temperature gradients between the inner region of a storage silo and the inner region of the reactor, while air which is trapped in the bulk material is substantially removed therefrom during transport.

In this connection, double pendulum flap systems or vane cell locks are known by means of which the above mentioned products can be transported into a reactor room substantially separated from the atmospheric side. The double pendulum flap system functions in a substantially continuous manner and the vane cell lock is continuous. Both systems are expensive and require extensive processing and control technology.

It is therefore the purpose of the present invention to present a conveying and lock system which removes gas from the transported bulk material to the extent that the material contains captured atmospheric air, wherein the gas phase in a container such as reactor is separated from the atmospheric gas phase.

SUMMARY OF THE INVENTION

This purpose is achieved in accordance with the invention in that the screw shaft has a section which is free of windings and is disposed, in the axial direction, between the inlet and the outlet opening and located between a plurality of first windings in the inlet region and a plurality of second windings in the outlet region, wherein the first windings have a bulk material transport capacity which is equal to or larger than that of the second windings.

The conveying and lock system in accordance with the invention has the substantial advantage that, in contrast to a double pendulum flap or to a corresponding vane cell lock, the locked chamber or the locked chambers must not be evacuated and no special seals are required to seal the chamber between two pendulum flaps or to seal each individual chamber of the vane cell lock with respect to atmosphere. In the conventional systems, the air is removed from the bulk material being transported by producing a vacuum within the chamber accepting the bulk material. Before the locked chamber is opened with respect to the inner region of the reactor, the conventional system must apply vacuum. In the system in accordance with the instant invention, it is not necessary for a vacuum to be established within the transport screw, since the bulk material is compressed in the winding-free section of the transport screw to generate a bulk material plug. Through establishment of the bulk material plug, the gas located in the bulk material is pressed out and can flow out of the conveying and lock system by way of a gas vent opening.

The section of the screw shaft which does not have any windings, the so-called winding-free region, can have different sizes and different axial lengths, since that region must be adjusted to the bulk material properties of the bulk material being transported. The diameter of the housing of the conveying and lock system can be increased or decreased in a straight forward manner and the axial length of the winding-free zone can be shortened or lengthened in dependence on the bulk material. Moreover, complete reconstruction of the overall conveying and lock system is not necessary in the event that the transport capacity of the first winding section is adjusted relative to that of the second winding section. The differing transport capacities of the first and a second winding sections can be used to determine the degree of compression of the bulk material plug in the winding-free region of the screw shaft.

In a preferred embodiment of the invention, the first and second windings have winding flanks which are connected, without openings, to the screw shaft. This has the advantage that, during transport of the bulk material in the first as well as in the second winding regions, the free areas between the windings are completely filled with the bulk material being transported and the winding flanks in addition to the bulk material being transported itself, both constitute gas barriers between the atmosphere and the gas phase inside the reactor region.

The conveying and lock system advantageously has a conical tapering in the entrance region and, preferentially, a first cylindrical region, a conically tapered section and a second cylindrical section. This has the advantage that the bulk material being transported is already compressed in the first winding region such that a barrier between the atmosphere and the reactor region is formed even before it gains entrance to the winding-free section of the transport screw.

It is particularly advantageous in the event that the conveying and lock system has a hollow shaft on which the screw shaft is mounted. For inventive conveying and lock systems constructed in this manner, it is very straight forward to replace or exchange screw shafts. The basic structure of the conveying and lock system remains unchanged and a new screw shaft is merely introduced onto the hollow shaft.

It is furthermore advantageous when the hollow shaft is sealed with respect to atmosphere by means of a sliding ring seal, preferably a double action sliding ring seal. A sealing system of this kind prevents gas, in this case air, from entering into the reactor region when the hollow shaft is driven. In the event that reactions or material processes are carried out within the reactor which must be effected in the absence of air, the conveying and lock system in accordance with the invention provides such operating conditions in a manner which is robust and insensitive to failure.

In the event that the housing of the conveying and lock system is subdivided in the axial direction a plurality of times, in particular two times, different screw geometries can be used along the hollow shaft for the first winding region and for the second winding region. In this manner, the conveying and lock system in accordance with the invention can be tailored to widely varying transport properties of a bulk material.

A vent opening is preferential provided in the inlet region on the housing by means of which gases associated with the compression of the bulk material during the transport process within in the conveying and lock system can escape.

In a further embodiment of the invention, the housing of the conveying and lock system has, at least in the outlet region, a double wall for the passage of a fluid. The conveying and lock system can thereby be cooled or warmed according to need such that the bulk material can be transported out of a storage silo and into the reaction region in a safe and constant fashion.

The temperature of a fluid which is used for cooling or warming the screw housing is advantageously chosen in such a fashion that the flow behavior or the bulk material remains substantially unchanged.

In a further advantageous embodiment of the invention, an axially displaceable rod is provided within the hollow shaft which has a plate at a free end thereof which closes the output opening in a first end position thereof and which, in a second end position, completely frees the full transport capacity of the conveying screw. With this structured configuration, the bulk material leaving the conveying and lock system can be compressed one more time by narrowing the output gap between the plate and the screw windings of the second winding region. Moreover, radiative heat or cold can be shielded from the bulk material being transported by means of the plate. In addition, the conveying and lock system can be blocked by closing the gap between the second winding region and the associated plate. The overall reliability of the entire manufacturing process can be thereby increased and, in the event of failure or malfunction, the conveying and lock system can be completely closed.

In a further configuration, the end of the hollow shaft facing the plate has a bellows. By means of the bellows, it is possible to displace the plate in the hollow shaft in a gas-tight fashion and, thereby prevent gas from penetrating into and negatively influencing processing in the reaction region.

It can be particularly advantageous when a pipe surrounds the screw shaft at a separation from the housing in the region of the outlet opening and projects in a axial direction past the outlet end of the screw shaft. This measure is advantageous in the event that a temperature is present in the reactor chamber which strongly differs from the outside temperature or in the event that the bulk material being transported has high temperature sensitivity which can influence its transport properties. In the event that the tube projects past the screw shaft, an additional cooling or warming function can be effected.

The overall reliability of the entire system can be increased by providing a pressure sealed blocking element, in particular a gate valve, at the inlet opening, disposed between a bulk material delivering system and the inlet opening. In the event of failure, the conveying and lock system can be sealed in a air tight manner and blocked at this location.

The tube which surrounds the screw shaft at a separation can have a connecting wall at the output end of the screw shaft which defines an enclosed region between the tube and the housing of the screw shaft. This region can thereby be provided with a dedicated insulator.

In a preferred example of an application, the conveying and lock system can be used to introduce plastic waste as a bulk product into a reactor for the production of high energy fuels, wherein the screw shaft used for this purpose has a compression zone in the transport region of the screw shaft between the inlet and the outlet regions. In the outlet region, the screw shaft can be displaced to different degrees via a plate and the output zone is jacketed by a tube which is separated from the housing of the screw shaft. The tube projects along with the output region into the reactor, wherein only the tube dips into a fluid surface formed within the reactor. Should the tube dip below the fluid surface and should the transport region of the screw shaft in the second winding region be separated from this liquid surface, the tube which surrounds the output region acts as a protective shield to block radiative heat coming from the reaction process of the reactor which then only enters into the conveying and lock system to a limited extent. In this manner, one prevents the plastic waste from already melting in the entrance region to the reactor, which could block the transport system and cause disruption thereof. In this fashion, a proper introduction of the plastic waste into the reactor is guaranteed for long periods of time. The plastic waste is transported from room temperature into a reactor having processing temperatures between 200 degrees and 500 degrees. The plastic waste is introduced into the reactor by means of the conveying and lock system and the plastic waste thereby transported is not warmed above the melting point of the individual plastics. In this manner, reproducible and reliable transport behavior of the plastic waste in the conveying and lock system is guaranteed.

BRIEF DESCRIPTION OF THE DRAWING

The conveying and lock system is described in greater detail below by way of examples in the figures.

DESCRIPTION OF THE PREFERRED EMBODIMENT

Figure 1:
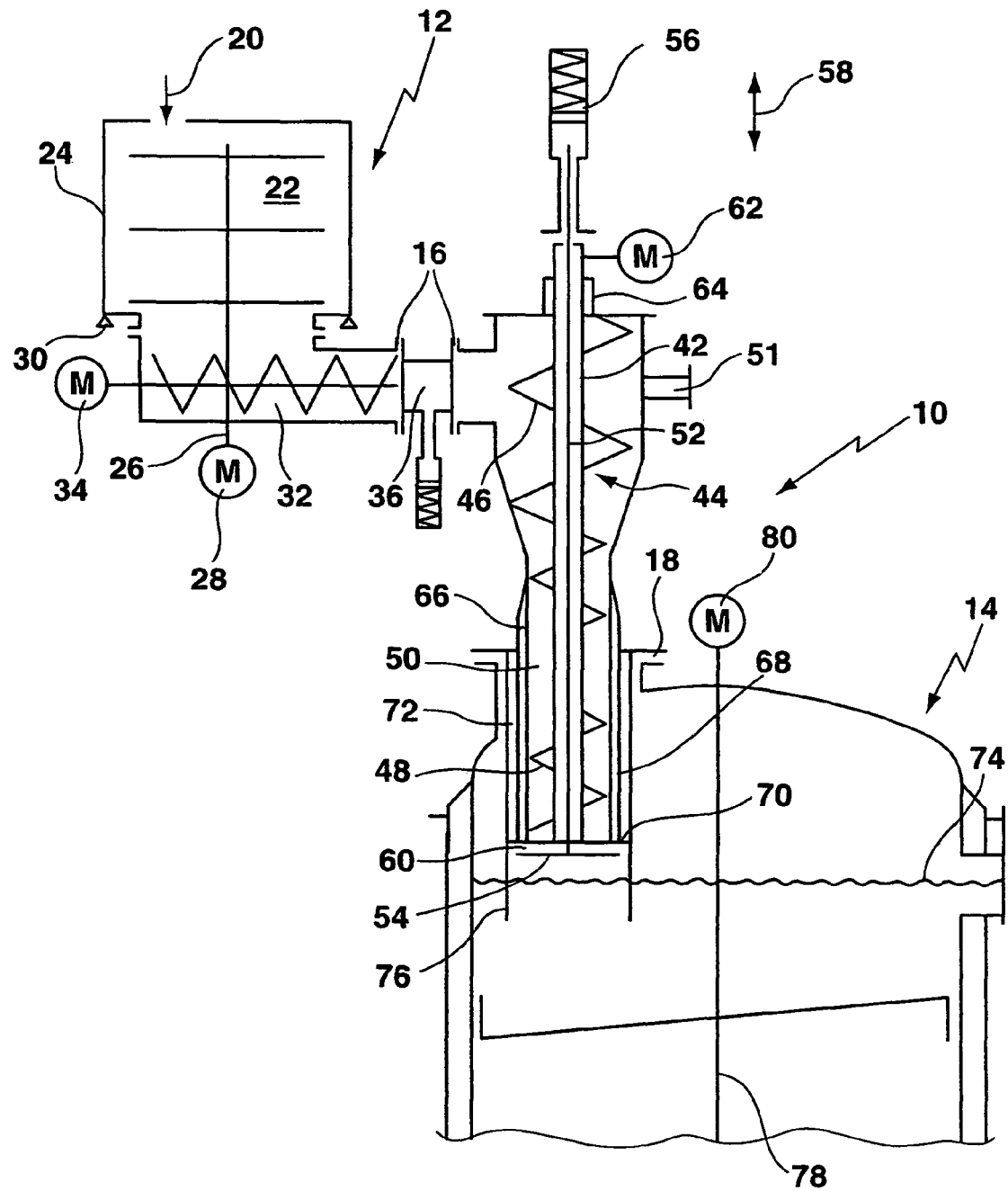
FIG. 1 is a highly schematic illustration of a conveying and lock system in accordance with the invention for transport into a reactor.

Reference symbol 10 of FIG. 1 depicts a conveying and lock system which is disposed between a delivery system 12 and a reactor 14. The conveying and lock system 10 is connected to the delivery system 12 as well as to the reactor 14 in a permanent fashion by means of flange connections 16 and 18.

Plastic particles or plastic waste in the form of bulk material is introduced into an inner region 22 of a storage container 24 in the direction of arrow 20. The bulk material is kept in motion within the storage container 24 by means of a mixer 26 to prevent clumping of the bulk material particles or plastic shred located in the storage container 24. The mixer 26 is driven by a motor 28. The storage container 24 has a weighing device 30 for continuously monitoring delivery to the reactor 14. The weighing device 30 can be used to determine and define the transport capacity of a transfer screw 32 driven by a motor 34. The bulk material located in the storage container 24 is introduced to the conveying and lock system 10 by means of a transfer screw 32. A blocking element 36 is disposed between the transfer screw 32 and the conveying and lock system 10 (in this case a gate valve) with which the transport flow of bulk material coming from the storage container 24 into the conveying and lock system 10 can be interrupted.

The conveying and lock system 10 is flanged to the transfer screw 32. The conveying and lock system 10 has a housing 40 in which a hollow shaft 42 is borne. The hollow shaft 42 has a screw shaft 44 having first windings 46 (first winding section) and second windings 48 (second winding section). A winding-free section 50 (screw-free region) is disposed between the first windings 46 and the second windings 48.

When a bulk material, in this case plastic particles or plastic shred, is introduced via the transfer screw 32 into the conveying and lock system 10, the first windings 46 transport the bulk material into the winding-free section 50. The first windings 46 have thread flanks which extend from the screw shaft 42 to a proximity of the housing 40. The first windings 46 transport the bulk material into the winding-free section 50 where it is compressed until the entire winding-free section 50 is filled with compressed bulk material particles, thereby forming a bulk material plug. During this compression, the gas located between the particles is expelled and can flow out of the conveying and lock system 10 by means of vent openings 51. When the winding-free section 50 is completely filled with bulk material particles, these bulk material particles are transported into the reactor 40 by means of the second windings 48.

The screw shaft 44 is disposed in a rotationally secure fashion onto the hollow shaft 42 and can be exchanged if desired.

A rod 52 is disposed in the hollow shaft 42 and has a plate 54 at a free end thereof facing the reactor 14. An adjustment mechanism can displace the rod 52 and thereby the plate 54 in the direction of arrow 58. A gap 60 is formed between the free end of the housing 40 and the plate 54, the width of which can be adjusted by displacing the rod 52. The gap 60 can be completely closed by means of a plate 54 or sufficiently opened that the product transfer capacity of the second winding 48 into the reactor 15 is not throttled.

The hollow shaft 42 is driven by a motor 62 and is sealed by a double action sliding ring seal 64 so that no gas can penetrate into the reactor region of the reactor 14 in consequence of rotational connections within the conveying and locking system 10.

A jacket 66 is provided on the housing 40, at least at the outlet end of the conveying and lock system 10, by means of which the housing 40 and thereby the screw shaft 44 can be cooled or warmed by a fluid. A tube 68 is attached at the output end of the conveying and lock system 10 at a separation from the jacket 66 and projects in the axial direction of the conveying and lock system 10 and into the reactor 14 past the free end of the hollow shaft 42 and of the plate 54 and by a further axial extent than does the plate 54. The tube 68 has a connecting wall 70 between the jacket 66 and the inner wall of tubes 68 so that a closed region 72 is defined between the jacket 66 and the tube 68. Depending on the application, the closed region 72 can be filled with an insulating material or with a cooling or warming medium.

The tube 68 projects in an axial direction past the screw shaft 44 and dips, with its free end 76 into a liquid surface 74. The tube 68 can shield radiative heat and prevent it from entering into the transported bulk material.

The reactor 14 has a mixer 78 which is driven by a motor 80. By means of the structural features of the conveying and lock system 10, bulk materials can be transported from atmosphere into a reactor while preventing gas exchange and the production temperature of the bulk material can be adjusted in a controlled fashion by means of cooling or warming elements on the conveying and lock system 10 so that the transport temperature of bulk material and the conveying and lock system can be changed to influence the transport properties of the material being transported or can be kept constant.

Figure 2:
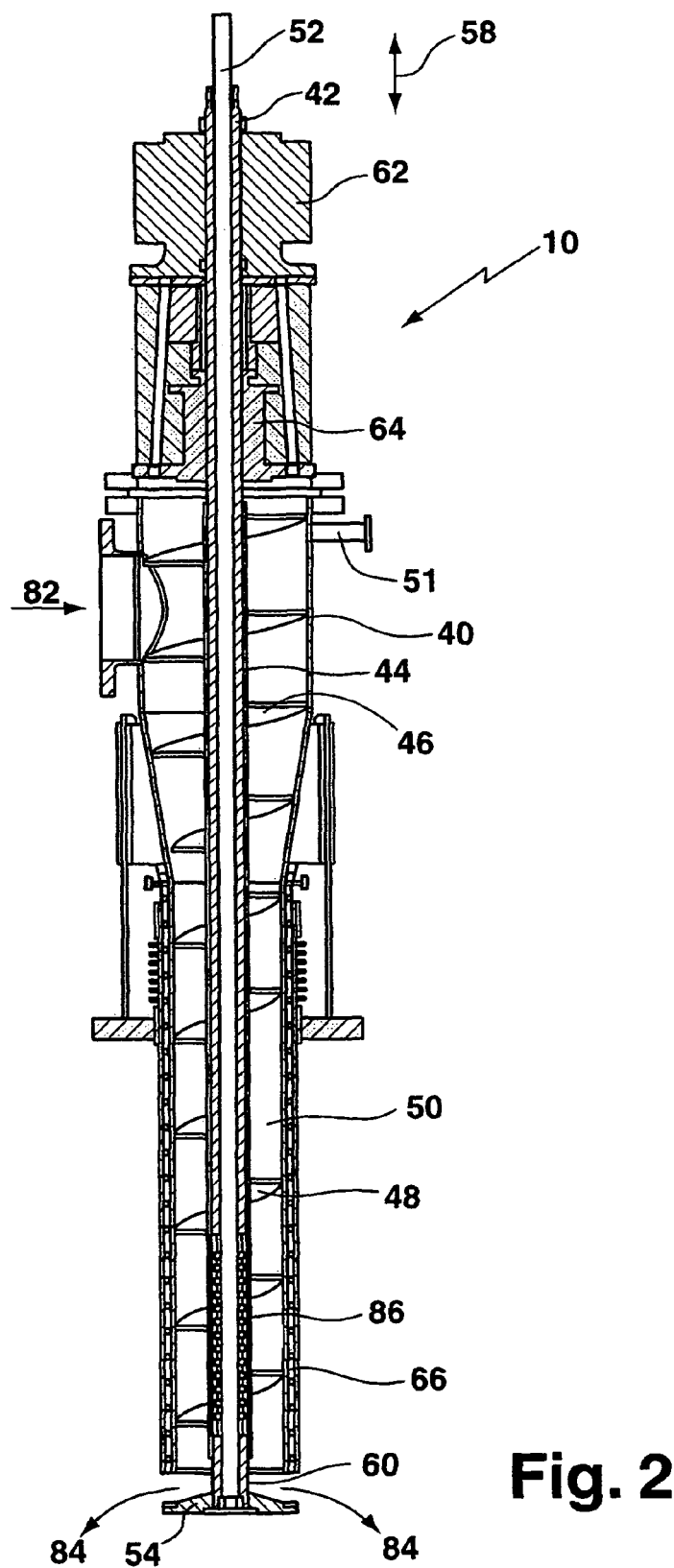
FIG. 2 shows a detailed section of a conveying and lock system in accordance with the invention and compared to the conveying and lock system of FIG. 1.

FIG. 2 shows a detail section of the transport and conveying and lock system 10. The hollow shaft 42 disposed in the housing 40 is driven by a motor 62. A screw shaft 44 is disposed on the hollow shaft 42 and, if necessary, can be exchanged. The screw shaft 44 has first windings 46 and second windings 48. The winding-free section 50 is provided between the first windings 46 and the second windings 48. A vent opening 51 is disposed on the housing 40 by means of which gases can flow out of the housing 40.

A rod 52 is disposed in the hollow shaft 42 and has a plate 54. The rod 52 can be displaced in the direction of arrows 58 in a manner not shown. The hollow shaft 42 is sealed by a sliding seal, in this case, a double acting sliding seal ring 64. The gap 60 between the free end of the housing 40 and the plate 54 can be adjusted by displacing the rod 52. If desired, the plate 55 can be displaced up to the housing 40 so that the gap 60 can be completely closed. In another adjustment position of the gap 60, the gap can be sufficiently wide that the plate 54 does not influence the bulk material transport through the conveying and lock system 10.

Bulk material particles are transported into the conveying and lock system 10 in the direction of arrow 82 and are introduced by means of first windings 46 into the winding-free section 50. The bulk material particles are compressed in the winding-free section 50 and gases are simultaneously removed therefrom. The freed gas can escape from the housing 40 by means of vent openings 51. A product plug is formed in the winding-free section 50 and can be partially relieved by means of the second windings 48 when the region in the winding-free sections 50 is completely filled with the compressed bulk material particles. The bulk material particles can pass through the gap 60 into a reactor (not shown in FIG. 2) in the direction of arrow 84.

The plate 54 is attached to the hollow shaft 42 by means of a bellows 86 so that the plate 54 can be displaced in the direction of arrow 58 by rod 52.

A conveying and lock system 10 for the introduction of a bulk product, without gas, into a reactor 14 while preventing gas exchange at low pressure differences, has a screw shaft 44 on which a first winding 46 and a second winding 48 are disposed. A winding-free section 50 is located between the first and the second windings 46, 48 in which the transported bulk product can be compressed. The compression generates a bulk product plug which is substantially free of gas and during transport of the bulk product by means of the screw shaft 44, the bulk product plug is constantly formed in the conveying and lock system 10 to prevent an exchange of gas between the product inlet and the product outlet of the conveying and lock system 10.

We claim:

1. A conveying and lock system for the introduction of a bulk product into a reactor while blocking gas and preventing gas exchange at low differential pressures, the system comprising:
    a housing having an inlet opening and an outlet opening;
    a screw shaft disposed within said housing to transport the bulk product from said inlet opening to said outlet opening, said screw shaft having a plurality of first windings disposed in an inlet region thereof, a plurality of second windings disposed in an outlet region thereof, and a winding-free section disposed in an axial direction between said inlet and said outlet openings, said first windings having a first transport capacity of bulk product which is equal to or in excess of a second transport capacity of said second windings, wherein said screw shaft has a compression zone in a transport region of said screw shaft between said inlet and outlet regions; and
    a plate cooperating with said screw shaft at said outlet region for closing or opening said outlet region to differing degrees, wherein the conveying and lock system has a hollow shaft on which said screw shaft is disposed, said hollow shaft comprising an axially displaceable rod having a plate at a free end thereof which, in a first end position, closes said outlet opening and, in a second end position, frees a transport capacity of said screw shaft in a completely unthrottled fashion, wherein said hollow shaft ends in a bellows in a direction of said plate.

2. The conveying and lock system for introducing a bulk product of claim 1, wherein said first and said second windings are connected, without interruption, to said screw shaft.

3. The conveying and lock system for introduction of a bulk product of claim 1, wherein the conveying and lock system has a conical tapering in said inlet region or a first cylindrical section, a conical tapered section, and a second cylindrical section.

4. The conveying and lock system for introduction of a bulk product of claim 1, wherein said hollow shaft is sealed with respect to atmosphere by means of a sliding ring seal or a double action sliding ring seal.

5. The conveying and lock system for introduction of a bulk product of claim 1, wherein said housing is subdivided in an axial direction a plurality of times or into two parts.

6. The conveying and lock system for introduction of a bulk product of claim 1, wherein an introduction region of said housing has a vent opening.

7. The conveying and lock system for introduction of a bulk product of claim 1, wherein at least an outlet region of said housing has a double wall structure for passage of a fluid.

8. The conveying and lock system for introduction of a bulk product of claim 7, wherein said fluid has a temperature which substantially maintains a flow behavior of the bulk product transported in the conveying and lock system.

9. The conveying and lock system for introduction of a bulk product of claim 1, wherein a tube surrounds said screw shaft in a region of said outlet opening at a separation from said housing and projects in an axial direction past an outlet end of said screw shaft.

10. The conveying and lock system for introduction of a bulk product of claim 9, wherein said tube has a connecting wall at an outlet end of said screw shaft which closes a sealed region between said tube and said housing.

11. The conveying and lock system for introduction of a bulk product of claim 1, wherein a pressure type blocking element or a gate valve is disposed between a bulk material delivery system and said inlet opening.

12. A conveying and lock system for the introduction of plastic waste as bulk product into a reactor via a screw shaft while blocking gas and preventing gas exchange at low differential pressures to produce high enemy fuels, the system comprising:

a housing having an inlet opening and an outlet opening;

a screw shaft disposed within said housing to transport the bulk product from said inlet opening to said outlet opening, said screw shaft having a plurality of first windings disposed in an inlet region thereof, a plurality of second windings disposed in an outlet region thereof, and a winding-free section disposed in an axial direction between said inlet and said outlet openings, said first windings having a first transport capacity of bulk product which is equal to or in excess of a second transport capacity of said second windings, wherein said screw shaft has a compression zone in a transport region of said screw shaft between said inlet and outlet regions; and a plate cooperating with said screw shaft at said outlet region for closing or opening said outlet region to differing degrees, wherein said outlet region is jacketed by a tube which is separated from said housing, said tube and said outlet region projecting into the reactor, wherein only said tube dips into a liquid surface formed within the reactor.

13. The conveying and lock system for introducing a bulk product of claim 12, wherein said first and said second windings are connected, without interruption, to said screw shaft.

14. The conveying and lock system for introduction of a bulk product of claim 12, wherein the conveying and lock system has a conical tapering in said inlet region or a first cylindrical section, a conical tapered section, and a second cylindrical section.

15. The conveying and lock system for introduction of a bulk product of claim 12, wherein the conveying and lock system has a hollow shaft on which said screw shaft is disposed.

16. The conveying and lock system for introduction of a bulk product of claim 15, wherein said hollow shaft is sealed with respect to atmosphere by means of a sliding ring seal or a double action sliding ring seal.

17. The conveying and lock system for introduction of a bulk product of claim 15, wherein said hollow shaft has an axially displaceable rod having a plate at a free end thereof which, in a first end position, closes said outlet opening and, in a second end position, frees a transport capacity of said screw shaft in a completely unthrottled fashion.

18. The conveying and lock system for introduction of a bulk product of claim 17, wherein said hollow shaft ends in a bellows in a direction of said plate.

19. The conveying and lock system for introduction of a bulk product of claim 12, wherein said housing is subdivided in an axial direction a plurality of times or into two parts.

20. The conveying and lock system for introduction of a bulk product of claim 12, wherein an introduction region of said housing has a vent opening.

21. The conveying and lock system for introduction of a bulk product of claim 12, wherein at least an outlet region of said housing has a double wall structure for passage of a fluid.

22. The conveying and lock system for introduction of a bulk product of claim 21, wherein said fluid has a temperature which substantially maintains a flow behavior of the bulk product transported in the conveying and lock system.

23. The conveying and lock system for introduction of a bulk product of claim 12, wherein said tube surrounds said screw shaft in a region of said outlet opening at a separation from said housing and projects in an axial direction past an outlet end of said screw shaft.

24. The conveying and lock system for introduction of a bulk product of claim 23, wherein said tube has a connecting wall at an outlet end of said screw shaft which closes a sealed region between said tube and said housing.

25. The conveying and lock system for introduction of a bulk product of claim 12, wherein a pressure type blocking element or a gate valve is disposed between a bulk material delivery system and said inlet opening.

* * * * *